(12) United States Patent
Peng et al.

(10) Patent No.: US 7,894,308 B2
(45) Date of Patent: *Feb. 22, 2011

(54) NEAR-FIELD OPTICAL TRANSDUCERS HAVING A TILTED METALLIC PIN

(75) Inventors: Chubing Peng, Pittsburgh, PA (US); Longting He, Wexford, PA (US)

(73) Assignee: Seagate Technology LLC, Scotts Valley, CA (US)

(*) Notice: Subject to any disclaimer, the term of this patent is extended or adjusted under 35 U.S.C. 154(b) by 1254 days.

This patent is subject to a terminal disclaimer.

(21) Appl. No.: 11/475,767

(22) Filed: Jun. 27, 2006

(65) Prior Publication Data

US 2007/0297082 A1    Dec. 27, 2007

(51) Int. Cl.
*G11B 11/00* (2006.01)

(52) U.S. Cl. ............ 369/13.33; 369/13.32; 369/112.27; 360/59

(58) Field of Classification Search ............ 369/13
See application file for complete search history.

(56) References Cited

U.S. PATENT DOCUMENTS

| | | |
|---|---|---|
| 4,947,034 A | 8/1990 | Wickramasinghe et al. |
| 4,994,818 A | 2/1991 | Keilmann |
| 5,004,307 A | 4/1991 | Kino et al. |
| 5,121,256 A | 6/1992 | Corle et al. |
| 5,125,750 A | 6/1992 | Corle et al. |
| 5,286,971 A | 2/1994 | Betzig et al. |
| 5,602,820 A | 2/1997 | Wickramasinghe et al. |
| 5,664,036 A | 9/1997 | Islam |
| 5,883,872 A | 3/1999 | Kino |
| 5,930,434 A | 7/1999 | Mowry et al. |
| 5,982,716 A | 11/1999 | Kino et al. |
| 6,043,940 A | 3/2000 | Kamiyama et al. |
| 6,055,220 A | 4/2000 | Mamin et al. |
| 6,091,694 A | 7/2000 | Späth |
| 6,275,453 B1 | 8/2001 | Ueyanagi et al. |

(Continued)

FOREIGN PATENT DOCUMENTS

EP    1128372 A2    8/2001

(Continued)

OTHER PUBLICATIONS

T. D. Milster et al., "Super-Resolution by Combination of a Solid Immersion Lens and an Aperture," *Jpn. J. Appl. Phys.*, vol. 40, Part 1, No. 3B, Mar. 2001, pp. 1778-1782.

(Continued)

*Primary Examiner*—Joseph H Feild
*Assistant Examiner*—Kezhen Shen
(74) *Attorney, Agent, or Firm*—Benjamin T. Queen, II; Pietragallo Gordon Alfano Bosick & Raspanti, LLP

(57) ABSTRACT

An optical transducer includes an optical element for directing an electromagnetic wave to a focal region and a metallic nano-structure having a longitudinal axis non-parallel to an electric field of the electromagnetic wave. The optical element for directing an electromagnetic wave may comprise one of a solid immersion lens, a solid immersion mirror, or a planar waveguide. The metallic nano-structure may comprise a metallic pin. The metallic nano-structure may be structured and arranged for resonant coupling of energy into a recording medium.

17 Claims, 4 Drawing Sheets

U.S. PATENT DOCUMENTS

| | | | |
|---|---|---|---|
| 6,298,026 | B1 | 10/2001 | Suzuki et al. |
| 6,320,708 | B1 | 11/2001 | Ueyanagi et al. |
| 6,396,776 | B1 | 5/2002 | Ueyanagi |
| 6,408,123 | B1 | 6/2002 | Kuroda et al. |
| 6,473,385 | B1 | 10/2002 | Saito |
| 6,479,816 | B1 | 11/2002 | Oumi et al. |
| 6,795,630 | B2* | 9/2004 | Challener et al. ........... 385/129 |
| 2001/0004348 | A1* | 6/2001 | Ueyanagi .................. 369/118 |
| 2001/0009541 | A1 | 7/2001 | Ueyanagi |
| 2002/0056816 | A1 | 5/2002 | Stark |
| 2002/0080709 | A1 | 6/2002 | Park et al. |
| 2002/0114567 | A1 | 8/2002 | Novotny et al. |
| 2003/0015651 | A1 | 1/2003 | Kiguchi et al. |
| 2003/0128452 | A1 | 7/2003 | McDaniel et al. |
| 2003/0128633 | A1 | 7/2003 | Batra et al. |
| 2003/0128634 | A1 | 7/2003 | Challener |
| 2003/0137772 | A1 | 7/2003 | Challener |
| 2003/0184903 | A1 | 10/2003 | Challener |
| 2004/0001394 | A1* | 1/2004 | Challener et al. ........ 369/13.32 |
| 2004/0001420 | A1 | 1/2004 | Challener |
| 2004/0008591 | A1 | 1/2004 | Johns et al. |
| 2005/0041950 | A1* | 2/2005 | Rottmayer et al. .......... 385/147 |
| 2005/0078565 | A1* | 4/2005 | Peng et al. ............... 369/13.32 |

FOREIGN PATENT DOCUMENTS

| | | |
|---|---|---|
| EP | 1148370 A2 | 10/2001 |
| EP | 1148370 A3 | 10/2001 |
| JP | 2001-256664 | 9/2001 |

OTHER PUBLICATIONS

Y.-J. Kim et al., "Parallel Recording Array Head of Nano-Aperture Flat-Tip Probes for High-Density Near-Field Optical Data Storage," *Jpn. J. Appl. Phys.*, vol. 40, Part 1, No. 3B, Mar. 2001, pp. 1783-1789.

H. Hatano et al., "Plano-Convex Solid Immersion Mirror with a Small Aperture for Near-Field Optical Data Storage," *Optical Review*, vol. 9, No. 2, Feb. 4, 2002, pp. 66-69.

T. E. Schlesinger et al., "An Integrated Read/Write Head for Hybrid Recording," *Jpn. J. Appl. Phys.*, vol. 41, Part 1, No. 3B, Mar. 2002, pp. 1821-1824.

K. Goto et al., "Microoptical Two-Dimensional Devices for the Optical Memory Head of an Ultrahigh Data Transfer Rate and Density System Using a Vertical Cavity Surface Emitting Laser (VCSEL) Array," *Jpn. J. Appl. Phys.*, vol. 41, Part 1, No. 7B, Jul. 2002, pp. 4835-4840.

B. Goldberg et al., "Immersion Lens Microscopy of Photonic Nanostructures and Quantum Dots," *IEEE Journal of Selected Topics in Quantum Electronics*, vol. 8, No. 5, Sep./Oct. 2002, pp. 1051-1059.

C. W. Lee et al., "Feasibility Study on Near Field Optical Memory Using a Catadioptric Optical System," Samsung Electronics Co., Ltd., Korea, pp. WA4-1/137-WA4-3/139.

S. M. Mansfield et al., "Solid Immersion Microscope," *Appl. Phys. Lett*, vol. 57, No. 24, Dec. 10, 1990, pp. 2615-2616.

B. D. Terris et al., "Near-Field Optical Data Storage Using a Solid Immersion Lens," *Appl. Phys. Lett*, vol. 65, No. 4, Jul. 25, 1994, pp. 388-390.

Y. Martin et al., "Optical Data Storage Read Out at 256 Gbits/in$^2$," *Appl. Phys. Lett.*, vol. 71, No. 1, Jul. 7, 1997, pp. 1-3.

H. F. Ghaemi et al., "Surface Plasmons Enhance Optical Transmission Through Subwavelength Holes", *Physical Review B*, vol. 58, No. 11, Sep. 15, 1998, pp. 6779-6782.

K. Ueyanagi et al., "Proposal of a Near-Field Optical Head Using a New Solid Immersion Mirror," *Jpn. J. Appl. Phys.*, vol. 39, Part 1, No. 2B, Feb. 2000, pp. 888-891.

Y.-J. Kim et al., "Fabrication of Micro-Pyramidal Probe Array with Aperture for Near-Field Optical Memory Applications," *Jpn. J. Appl. Phys.*, vol. 39, Part 1, No. 3B, Mar. 2000, pp. 1538-1541.

S. Quabis et al., "Focusing Light to a Tighter Spot," *Optics Communications*, vol. 179, May 25, 2000, pp. 1-7.

R. Coehoorn et al., "Hybrid Recording," *Magnetic Storage Systems Beyond 2000*, Proceedings of the NATO-ASI on Rhodes (Greece), Jun. 2000, pp. 1-17.

J. R. Krenn et al., "Design of Multipolar Plasmon Excitations in Silver Nanoparticles;" *Applied Physics Letters*, vol. 77, No. 21, Nov. 20, 2000, pp. 3379-3381.

* cited by examiner

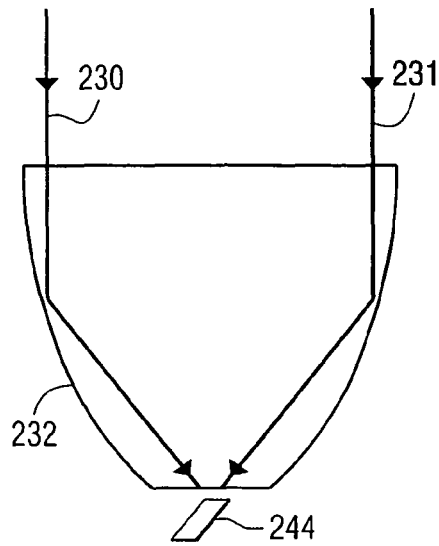
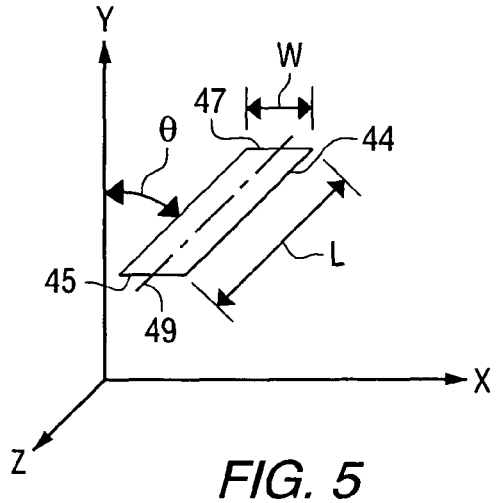
*FIG. 4*    *FIG. 5*
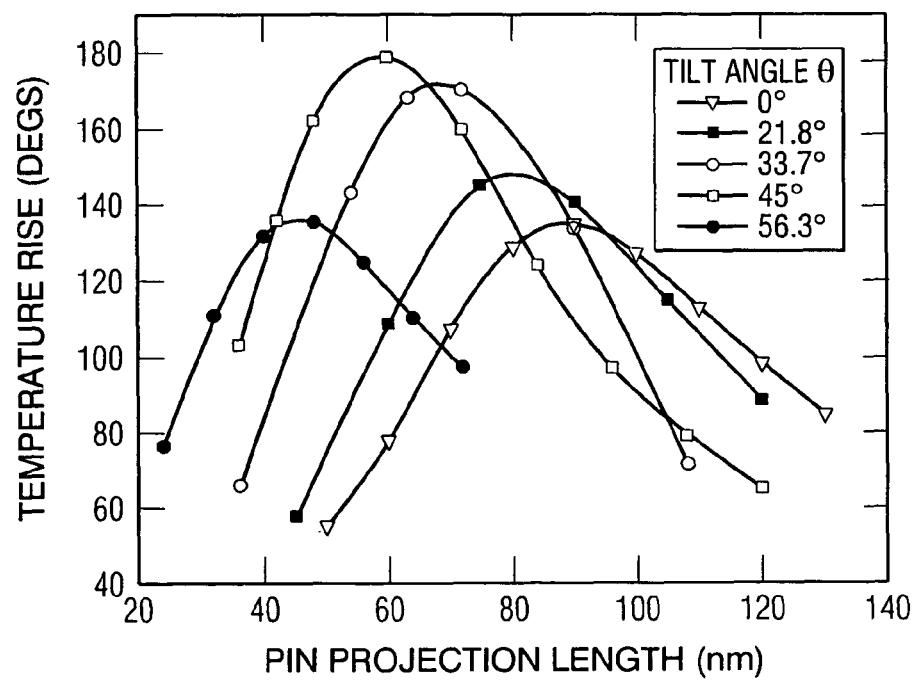
*FIG. 6*

NEAR-FIELD OPTICAL TRANSDUCERS HAVING A TILTED METALLIC PIN

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to optical transducers, and more particularly to optical transducers having a tilted metallic pin.

BACKGROUND OF THE INVENTION

In certain types of data storage, such as, for example, thermally assisted optical/magnetic data storage, information bits are recorded on a layer of a storage medium at elevated temperatures, and the heated area in the storage medium determines the data bit dimension. In one approach, an electromagnetic wave in the form of light is used to heat the storage medium. To achieve high areal data density, it is preferred to have a high light throughput to an optical spot well below the diffraction limit to heat the storage layer of the medium. Some prior systems have confined the light to a small spot but did not deliver a reasonable amount of optical power to the storage medium.

Thermal or heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. Heat assisted magnetic recording allows for the use of small grain media, which is desirable for recording at increased areal densities, with a larger magnetic anisotropy at room temperature to assure sufficient thermal stability. Heat assisted magnetic recording can be applied to any type of magnetic storage media, including tilted media, longitudinal media, perpendicular media and patterned media.

Heat assisted magnetic recording requires an efficient technique for delivering large amounts of light power to the recording medium confined to spots of, for example, 50 nm or less. Areal density and bit aspect ratio are among the factors which determine this size. Based on previous studies, 1 Tb/in$^2$ requires spots of 25 nm. A variety of transducer designs have been proposed and some have been experimentally tested. Among these are metal coated glass fibers and hollow pyramidal structures with metal walls. For all these approaches, confinement of the light depends on an aperture which is fabricated at the end of the structure and gives this kind of transducer the name "aperture probes." Generally these devices suffer from very low light transmission rendering the devices useless for HAMR recording. For example, tapered and metallized optical fibers have demonstrated light confinement down to approximately 50 nm with a throughput efficiency of $10^{-6}$. Pyramidal probes made from anisotropic etching of Si wafers have been designed with throughput efficiencies of $10^{-4}$ for similar spot sizes. Although this is the state of the art, it is still about two orders of magnitude too small for HAMR.

Solid immersion lenses (SILs) and solid immersion mirrors (SIMs) have also been proposed for concentrating far field optical energy into small spots. The optical intensity is very high at the focus but the spot size is still determined by the diffraction limit which in turn depends on the refractive index of the material from which the SIL or SIM is made. The smallest spot size which can be achieved with all currently known transparent materials is ~60 nm, which is too large for HAMR.

A metal pin can be used as a transducer to concentrate optical energy into arbitrarily small areal dimensions. In previously proposed designs that utilize a metal pin located at a focal point, the pin supports a surface plasmon mode which propagates along the pin, and the width of the radiated electric field generated by the surface plasmon mode is proportional to the diameter of the pin. For recording head arrangements that may utilize the transducer with pin configuration, such as a HAMR device, it is preferred that the pin be in the proximity of the write pole such that the maximum magnetic field generated by the write pole overlaps with the maximum thermal gradient so as to write sharp magnetic transients. However, it has been determined that the pin being in close proximity to the write pole may result in the surface plasmon excitation of the pin being quenched which results in the light delivery efficiency decreasing. In addition, light condensation of the device depends on the gap distance between the write pole and the pin which requires an alignment tolerance of approximately 1-2 nanometers making fabrication of the device more difficult.

There is a need for transducers that can provide a reduced spot size, increased throughput efficiencies, and simplification of manufacturing requirements.

There is also a need for new and improved optical transducer configurations capable of providing the necessary high intensities for generating intense optical spots with sufficiently small sizes to meet the demands of applications which require such optical spots.

There is further identified a need for improved optical transducers that overcome limitations, disadvantages, or shortcomings of known optical transducers.

SUMMARY OF THE INVENTION

An apparatus comprises an optical element structured and arranged to direct an electromagnetic wave to a focal region and a metallic nano-structure positioned at the focal region. The metallic nano-structure, which may be a metallic pin, has a longitudinal axis non-parallel to an electric field of the electromagnetic wave. More specifically, the metallic nano-structure may be tilted at an angle $\theta$ from the electric field of the electromagnetic wave wherein $\theta$ may be $0° < \theta \leq 70°$.

The invention also encompasses an optical transducer comprising a condenser shaped to direct an electromagnetic wave to a focal region and a tilted metallic pin positioned at the focal region.

Another aspect of the invention includes a recording head comprising a magnetic write pole, a condenser positioned adjacent to the magnetic write pole and being shaped to direct an electromagnetic wave to a focal region of the condenser, and a tilted metallic pin positioned at the focal region. The tilted metallic pin includes a first end adjacent an air-bearing surface of the recording head wherein the first end is spaced apart from the magnetic write pole a distance of about 10 nm to about 100 nm. The tilted metallic pin includes a second end which is tilted away from the magnetic write pole. The recording head may be structured and arranged for thermal assisted magnetic recording. In addition, the tilted metallic pin may be structured and arranged for resonant coupling of energy into a recording medium wherein the tilted metallic pin is tilted at an angle θ from a plane normal to a surface of the recording medium wherein 0°<θ≦70°.

BRIEF DESCRIPTION OF THE DRAWINGS

FIG. 4 illustrates an additional transducer embodiment of the invention.

FIG. 5 illustrates dimensions and angles of a metallic nano-structure relative to a coordinate system.

FIG. 6 is a graphical illustration of temperature rise versus pin length.

DETAILED DESCRIPTION OF THE INVENTION

Figure 1:
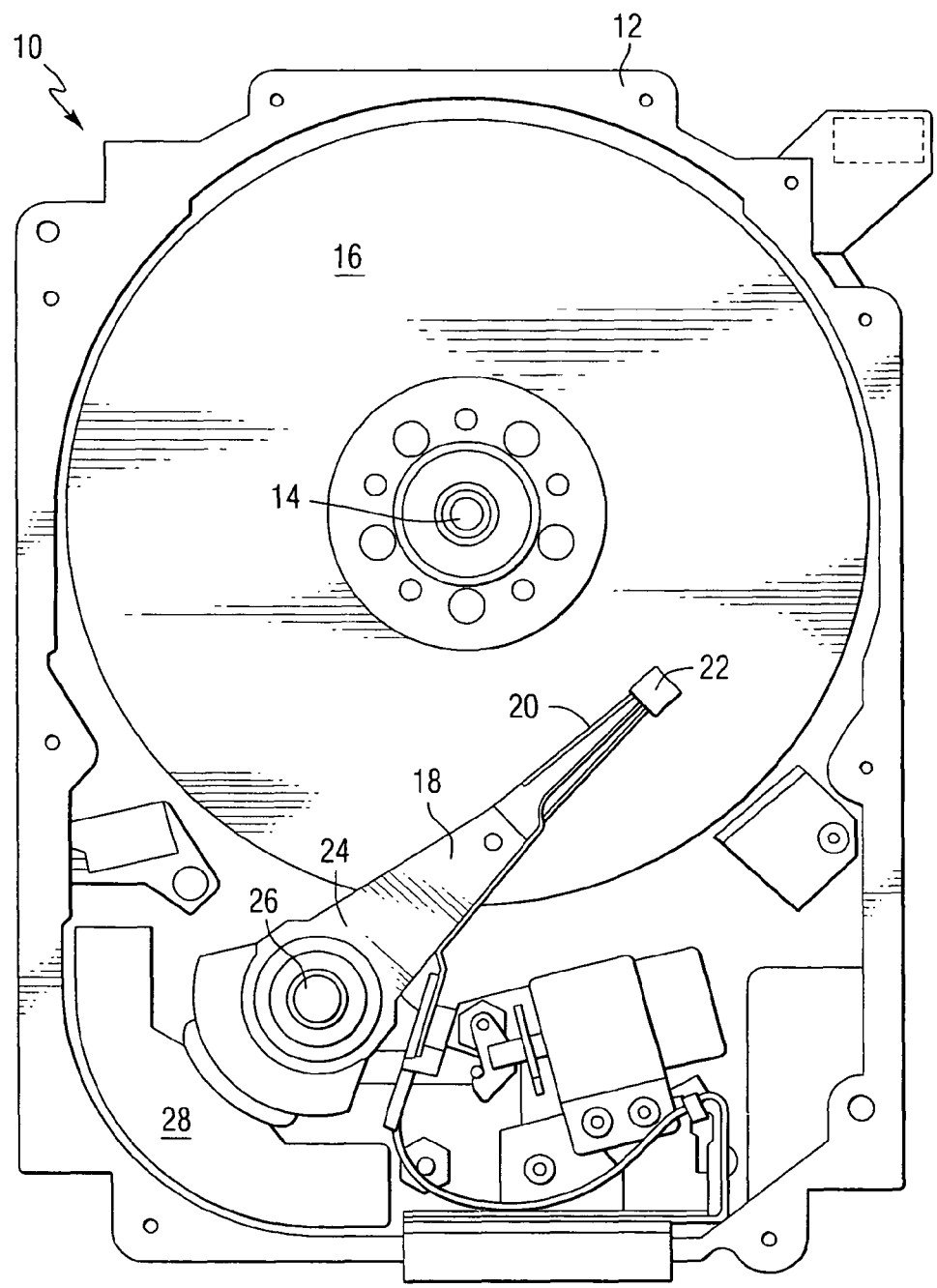
FIG. 1 is a pictorial representation of a magnetic disc drive that can include magnetic heads constructed in accordance with this invention.

This invention encompasses transducers that can be used in magnetic and optical recording heads for use with magnetic and/or optical recording media, as well as magnetic and/or optical recording heads that include such devices and disc drives that include the recording heads. FIG. 1 is a pictorial representation of a disc drive 10 that can utilize recording heads constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

For thermal or heat assisted magnetic recording (generally referred to herein as heat assisted magnetic recording or HAMR), an electromagnetic wave of, for example visible, infrared or ultraviolet light, is directed onto a surface of a data storage medium to raise the temperature of a localized area of the medium to facilitate switching of the magnetization of the area. Well-known solid immersion lenses (SILs) have been proposed for use in reducing the size of a spot on the medium that is subjected to the electromagnetic radiation. In addition, solid immersion mirrors (SIMs) have been described in the literature and proposed for use in heat assisted magnetic recording heads. SILs and SIMs may be either 3-dimensional or 2-dimensional. Planar waveguides that include focusing means such as mode index lenses and mirrors can also be used to concentrate the electromagnetic wave. All of these structures can serve as means for concentrating an electromagnetic wave to a focal region. A nano-structure, such as a metallic pin, can be positioned near the focal region to guide the electromagnetic wave to the surface of a recording medium. This invention provides an efficient means of coupling an electromagnetic wave to a nano-structure, such as a metallic pin.

Figure 2:
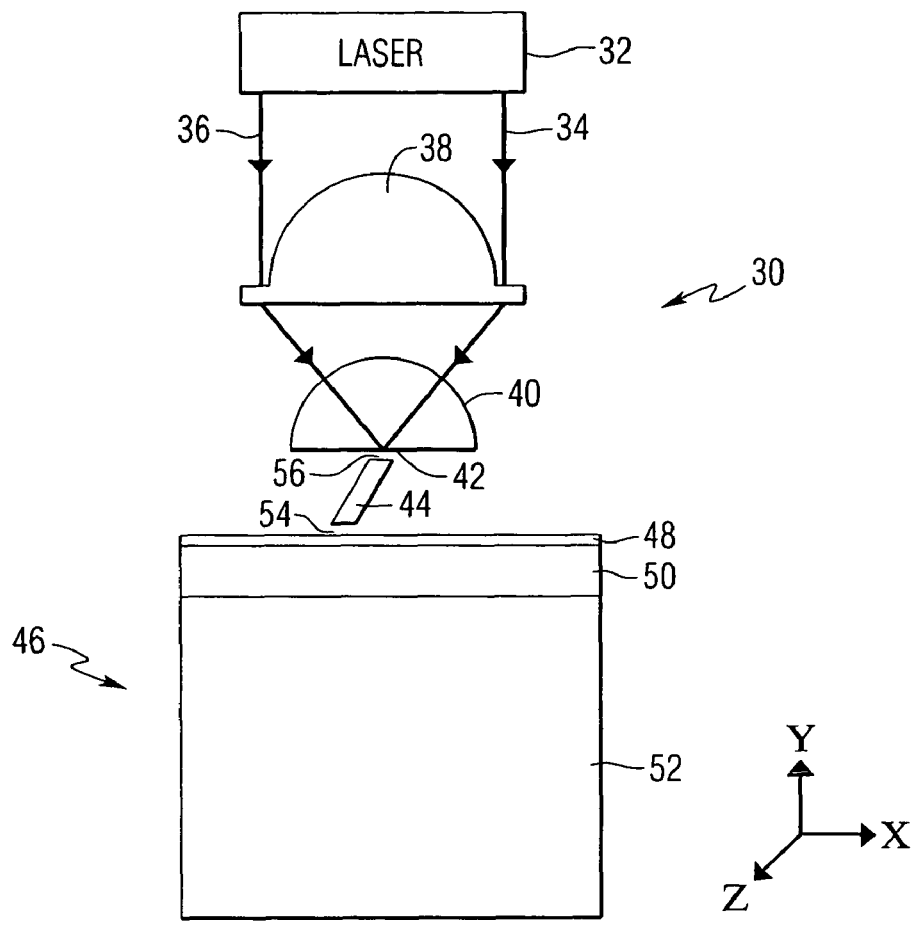
FIG. 2 is a schematic representation of a transducer constructed in accordance with this invention.

FIG. 2 is a schematic representation of a transducer 30 constructed in accordance with this invention. A source of electromagnetic radiation, such as a laser 32 produces a radially polarized beam of light, illustrated by arrows 34 and 36, that is delivered to an objective lens 38. A solid hemispheric lens 40 receives the light and concentrates it to a focal region 42. A nano-structure 44 in the form of an elongated metallic nano-wire, also called a pin, is positioned at, near or adjacent the focal region 42. The light, having unit power over the lens aperture, is brought to focus onto the center of the hemisphere by the objective lens, and illuminates the metallic pin 44. A magnetic storage medium 46 including a storage layer 48, which can be a 12 nm thick layer of a cobalt alloy or multi-layer of cobalt and/or iron, a heat-sink layer 50, which can be a 100 nm thick gold layer, and a substrate 52, is placed below the transducer 30. One end of the transducer can be separated from the surface of the storage medium by an air gap 54 of, for example, 10 nm. In one example the numerical aperture of the objective lens is 0.85, and the refractive index of the solid hemisphere is 2.09. The end of the nano-structure is separated from the solid hemispheric lens 40 by a gap 56. The length of gap 56 should be less than 50 nm. The electric field within the lens is coupled evanescently across the bottom surface of the lens into the nano-structure. For the calculated data in this description, the optical properties of, for example, cobalt were used to simplify the calculations.

In FIG. 2, X, Y, Z are three axes of a right-handed Cartesian coordinate system. The origin of the coordinate system (x, y, z)=(0,0,0) is at the center of the bottom surface of the solid hemisphere 40, which is also the focal point.

This invention provides a near-field optical transducer that includes an optical element for condensing an electromagnetic wave to a focal region, and an elongated metallic nano-structure such as a metallic pin. In one aspect of the invention, the nano-structure can be positioned in the region directly adjacent to but outside of the focal plane created by the condensing element. The long axis of the nano-structure is non-parallel to the direction of light propagation. The source of light is focused onto a region near one end of the nano-structure by the optical element. The focused beam for illuminating the nano-structure has a mode profile such that the long axis of the nano-structure is non-parallel to the electric field of the focused beam. The transducer confines the light and enhances the electric field at the other end of the nano-structure. For data storage, the transducer is brought in a close proximity to the storage layer. In this aspect of the invention, the metallic nano-structure is outside of the condenser in a lower index medium rather than embedded in a high index dielectric material or in a focusing optical element. This yields improved electric field enhancement and can deliver large amount of optical power to patterned storage media.

Figure 3:
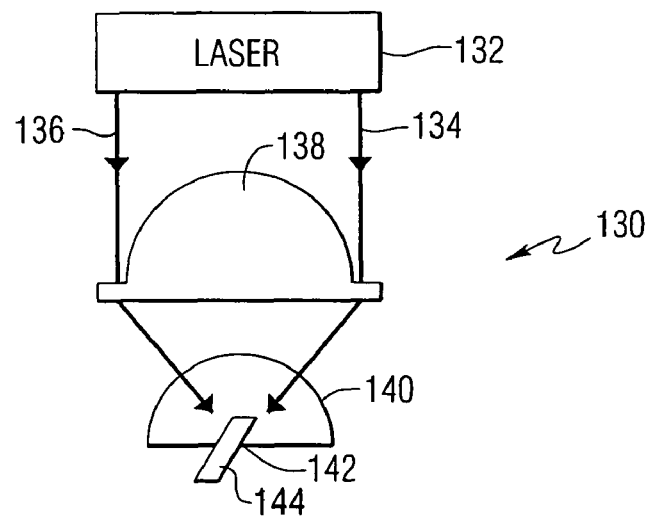
FIG. 3 is a partial schematic representation of a transducer constructed in accordance with this invention.

FIG. 3 is a partial schematic representation of a transducer 130 constructed in accordance with this invention. Similar to the transducer 30 illustrated in FIG. 2 and described herein, a source of electromagnetic radiation such as a laser 132 produces a radially polarized beam of light illustrated by arrows 134 and 136 that is delivered to an objective lens 138. A solid hemispheric lens 140 receives the light and concentrates it to a focal region 142. A nano-structure 144 in the form of an elongated metallic nano-wire, also called a pin, is positioned near the focal region 142. In this embodiment of the invention, the pin 144 is positioned at least partially within the lens 140. Similar to the metallic pin 44 illustrated in FIG. 2 and described herein, the pin 144 is tilted so as to have a longitudinal axis that is non-parallel to an electric field of the electromagnetic waves 134 and 136.

FIG. 4 illustrates an additional embodiment of the invention wherein radially polarized beams of light 230 and 231 are brought to focus on a tilted metallic pin 244 via a condenser 232. The condenser may be, for example, a three-dimensional rotational parabaloid or ellipsoidal mirror, or a two-dimensional parabolic or ellipsoidal mirror integrated in a planar waveguide.

FIG. 5 illustrates the width W (along the X and Z axes), the length L, and a tilt angle θ from the Y axis for the tilted metallic pin 44 as illustrated in FIG. 2 and described herein. It will be appreciated that the description set forth herein and illustrated in FIG. 5 for the tilted metallic pin 44 also applies to the tilted metallic pin 144 illustrated in FIG. 3 and the tilted metallic pin 244 illustrated in FIG. 4.

Still referring to FIG. 5, the Y axis corresponds to the direction of the electric field for the radially polarized beams of light 34 and 36 illustrated in FIG. 2. In addition, the Y axis corresponds to a plane that is normal to a surface of the storage medium 46 also illustrated in FIG. 2. The tilt angle θ may be $0° < \theta \leq 70°$. The width W for the tilted metallic pin 44 may be in the range of about 10 nm to about 200 nm. The length L of the tilted metallic pin 44 may be in the range of about 10 nm to about 500 nm.

The operation of the transducer in accordance with the invention, such as transducer 30 illustrated in FIG. 2, has been simulated for transducers wherein the nano-structure, such as the tilted metallic pin 44, comprises a gold pin or a silver pin. In one simulation, the gold pin used is a 48 nm wide along the X axis and 48 nm wide along the Z axis. A first end 45 of the tilted metallic pin 44 is positioned closest to the storage layer 48 of the storage medium 46. The tilted metallic pin 44 has an opposing second end 47. The tilted metallic pin 44 has a longitudinal axis 49, as illustrated in FIG. 5.

In one embodiment of the invention illustrated, for example in FIG. 2, the storage layer 48 is a cobalt film of 24 nm thickness and the heat sink layer 50 is a gold film of 100 nm thickness. The numerical aperture of the objective lens 38 is 0.85, and the refractive index of the solid hemispheric lens 40 is 2.09. The tilted metallic pin 44 is gold or silver and is 48 nm wide along both the X and Z axes. The length L of the tilted metallic pin 44 may be adjusted for optimization. Where θ is equal to zero, the tilted metallic pin is perpendicular to the storage layer 48 and parallel to the electric field of the excitation light from beams of light 34 and 36. Where θ is not equal to zero, the pin is tilted from the normal direction and is non-parallel to the electric field of the excitation light provided by the beams of light 34 and 36. In one embodiment, the excitation light is a laser having a wavelength of 833 nm. The complex refractive index is 0.188+j 5.89 for a gold pin and a gold film and the complex refractive index is 2.53+j 4.88 for a cobalt film that is used to form the storage layer 48.

In the thermal simulation, it is assumed that the optical properties (the index of refraction) and thermal coefficients (the specific heat C and thermal conductivity K) of all materials involved, including the solid hemisphere, the gold pin, the storage layer, the heat-sink layer, and the substrate, are temperature-independent. Heat flow from the gold pin to the storage media is not taken into account in the thermal calculation. It is also assumed that the specific heat C=2 joule/cm³/° C. for all the materials, and that the thermal conductivity K=0.1 watt/cm/° C. for the storage layer, which is about one-tenth of bulk value, K=3 watt/cm/° C. for the gold heat-sink layer, and K=0.1 watt/cm/° C. for the substrate.

FIG. 6 illustrates the temperature rise at the surface of the storage layer 48 versus pin length L at varying tilt angles θ. As described herein, a tilt angle of zero corresponds to a vertical pin having a longitudinal axis that is parallel to an electric field of an electromagnetic wave and for all tilt angles not equal to zero, the tilted metallic pin is non-parallel to the electric field of the electromagnetic waves. The calculated results show that temperature is a function of tilt angle of the pin.

Figure 7A:
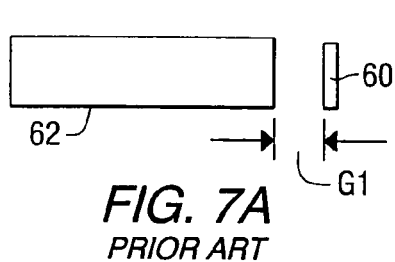
FIG. 7A illustrates a known magnetic pole and pin arrangement.
Figure 7B:
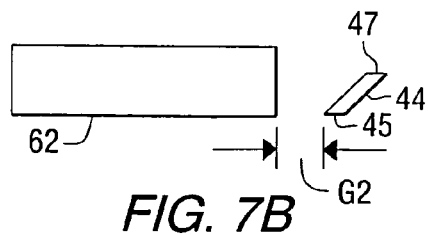
FIG. 7B illustrates a magnetic pole and pin arrangement in accordance with the invention.
Figure 7C:
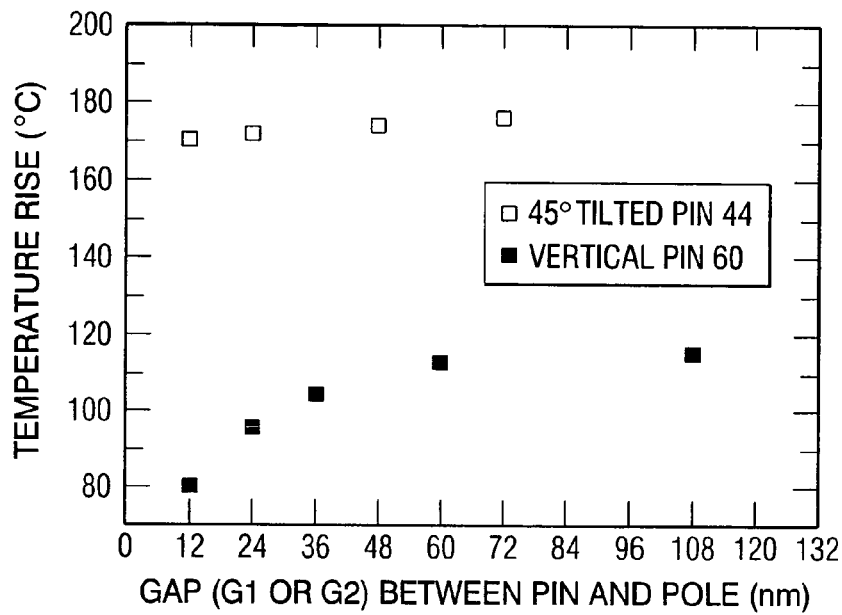
FIG. 7C is a graphical illustration of temperature rise versus gap distance between a magnetic pole and pin for the structures illustrated for FIGS. 7A and 7B.

FIG. 7A illustrates a known vertical metallic pin 60, i.e., having a tilt angle equal zero, positioned adjacent to a magnetic pole 62. FIG. 7B illustrates a tilted metallic pin 44 in accordance with the invention positioned adjacent a magnetic pole 62. The vertical pin 60 is separated from the magnetic pole 62 by a gap distance G1 and it will be appreciated that the entire length of the vertical pin 60 is separated from the magnetic pole 62 by the same gap distance G1. The tilted metallic pin 44 is separated from the magnetic pole 62 by a distance G2 at the first end 45 of the pin 44. G1 and G2 may be in the range of about 10 nm to about 100 nm. The second end 47 of the pin 44 is tilted away from the magnetic pole 62. FIG. 7C illustrates for comparative purposes the temperature rise versus the gap distances G1 or G2 for the vertical pin 60 and the tilted pin 44, respectively. It is seen that temperature rise decreases as the pin gets to the pole in both cases. The amount of decrease, however, is dependent on the configuration of pin relative to the pole. As the pin is tilted at 45°, the drop of temperature is much lower than what was observed in the pin-pole configuration without tilting.

Figure 8:
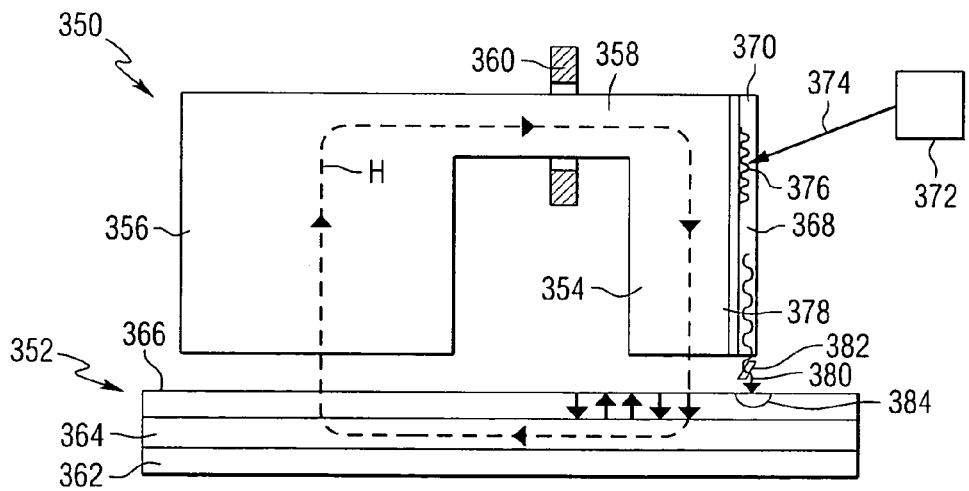
FIG. 8 is a schematic representation of a recording head constructed in accordance with this invention.

In another aspect, this invention encompasses magnetic recording heads that include the above described transducers. FIG. 8 is a schematic representation of a magneto-optical recording head 350 constructed in accordance with this invention. The recording head 350 is positioned adjacent to a magnetic recording medium 352. Although an embodiment of the invention is described herein with reference to recording head 350 as a perpendicular magnetic recording head and the medium 352 as a perpendicular magnetic recording medium, it will be appreciated that aspects of the invention may also be used in conjunction with other types of recording heads and/or recording mediums where it may be desirable to employ heat assisted recording. Specifically, the recording head 350 may include a writer section comprising a main write pole 354 and a return or opposing pole 356 that are magnetically coupled by a yoke or pedestal 358. It will be appreciated that the recording head 350 may be constructed with a write pole 354 only and no return pole 356 or yoke 358. A magnetization coil 360 surrounds the yoke or pedestal 358 for energizing the recording head 350. The recording head 350 also may include a read head, not shown, which may be any conventional type read head as is generally known in the art. The waveguide can alternatively be positioned on the other side of the pole. In another example, the pin and the pole can be the same material, in which case the pin can function as both the electromagnetic transducer and the source of the field.

Still referring to FIG. 8, the recording medium 352 is positioned adjacent to or under the recording head 350. The recording medium 352 includes a substrate 362, which may be made of any suitable material such as ceramic glass or amorphous glass. A heat sink layer and/or a soft magnetic underlayer 364 may be deposited on the substrate 362. The soft magnetic underlayer 364 may be made of any suitable material such as, for example, alloys or multilayers having Co, Fe, Ni, Pd, Pt or Ru. The heat sink layer may be made of any suitable layer such as Au, Ag, Cu or Al. A hard magnetic recording layer 366 is deposited on the soft underlayer 364, with substantially perpendicular oriented magnetic domains contained in the hard layer 366. Suitable hard magnetic materials for the hard magnetic recording layer 366 may include at least one material selected from, for example, FePt or CoCrPt alloys having a relatively high anisotropy at ambient temperature.

The recording head 350 also includes a planar waveguide 368 that directs light received from a light source onto a surface of a recording medium to heat the magnetic recording medium 352 proximate to where the write pole 354 applies the magnetic write field H to the recording medium 352. The planar waveguide includes a light transmitting layer 370. The optical waveguide 368 acts in association with a light source 372 which transmits light, for example via an optical fiber 374, that is coupled to the optical waveguide 368, by a coupling means such as a grating 376. The light source 372 may be, for example, a laser diode, or other suitable laser light sources. This provides for the generation of a light guided mode that may propagate through the optical waveguide 368 toward the recording medium. EM radiation, generally designated by reference number 380, is transmitted from a tilted metallic pin 382 for heating the recording medium 352, and particularly for heating a localized area 384 of the recording layer 366.

In heat assisted magnetic recording, the transducer is used to heat a portion of the storage medium and the heated portion of the storage medium is subjected to a magnetic field to affect the magnetization of a storage layer in the storage medium. The magneto-optical recording head can also include a reader as is well-known in the art.

The optical waveguide 368 can be constructed in accordance with any of the waveguides described above. The waveguides of this invention can also be used in optical recording applications in which either a magnetic field is not needed, such as write once and phase change recording, or where an external magnet could be positioned below the substrate, such as in magneto-optic recording. Alternatively, these structures could potentially be useful in a probe storage application or for high resolution near field optical lithography or for high resolution near field microscopy.

The transducers of this invention utilize pins which are dimensioned such that plasmon modes at the pins result from collective oscillations of electrons. This is also referred to as dipole plasmon resonance of the pins. The pin structures described in the examples have dimensions of a few hundred nanometers or less. Therefore, they can be described as nanoparticles or nano-structures. This resonance includes the geometric effects due to the shape and size of the pins. It is generally desirable for the metallic pins to have an aspect ratio (length to width) of 2:1 or greater. However, optimization of the aspect ratio of the pin depends on various factors, such as shape, material, dielectric index of the surrounding medium, and wavelength. The aspect ratio of a cylinder is the ratio of the height of the cylinder to the diameter of the cylinder. The aspect ratio of a rectangular pin is the ratio of the height of the pin to the width of the pin. For a spheroid, the aspect ratio is the ratio of the length of the major axis to the length of the minor axis.

While the invention has been described in terms of several examples, it will be apparent to those skilled in the art that various changes can be made to the disclosed examples, without departing from the scope of the invention as set forth in the following claims.

What is claimed is:

1. An apparatus comprising:
an optical element structured and arranged to direct an electromagnetic wave to a focal region; and
a metallic nano-structure positioned at the focal region and having a longitudinal axis non-parallel to an electric field of the electromagnetic wave, wherein the metallic nano-structure is tilted at an angle θ from the electric field of the electromagnetic wave wherein $21.8° \leq \theta \leq 70°$.

2. The apparatus of claim 1, wherein the metallic nano-structure is positioned outside of the optical element.

3. The apparatus of claim 1, wherein the metallic nano-structure is positioned at least partially inside of the optical element.

4. The apparatus of claim 1, wherein the metallic nano-structure is separated from an end of the optical element by a gap of less than 50 nm.

5. The apparatus of claim 1, wherein the metallic nano-structure comprises a metallic pin.

6. The apparatus of claim 1, wherein the metallic nano-structure is structured and arranged for resonant coupling of energy into a recording medium.

7. The apparatus of claim 6, wherein the metallic nano-structure is tilted at an angle θ from a plane normal to a surface of the recording medium wherein $21.8° \leq \theta \leq 70°$.

8. The apparatus of claim 1, wherein said optical element comprises one of a solid immersion lens, a solid immersion mirror, or a planar waveguide.

9. An optical transducer, comprising:
a condenser shaped to direct an electromagnetic wave to a focal region; and
a tilted metallic pin positioned at the focal region, wherein the tilted metallic pin is tilted at an angle θ from an electric field of the electromagnetic wave wherein $21.8° \leq \theta \leq 70°$.

10. The optical transducer of claim 9, wherein the tilted metallic pin is positioned outside of the condenser.

11. The optical transducer of claim 9, wherein the tilted metallic pin is positioned at least partially inside of the condenser.

12. A recording head comprising:
a magnetic write pole;
a condenser positioned adjacent to the magnetic write pole, the condenser being shaped to direct an electromagnetic wave to a focal region of the condenser; and
a tilted metallic pin positioned at the focal region, wherein the tilted metallic pin is tilted at an angle θ from an electric field of the electromagnetic wave wherein $21.8° \leq \theta \leq 70°$.

13. The recording head of claim 12, wherein the tilted metallic pin includes a first end adjacent an air bearing surface of the recording head, said first end spaced apart from said magnetic write pole a distance of about 10 nm to about 100 nm.

14. The recording head of claim 12, wherein the tilted metallic pin includes a second end, said second end tilted away from said magnetic write pole.

15. The recording head of claim 12 structured and arranged for thermal assisted magnetic recording.

16. The recording head of claim 12, wherein the tilted metallic pin is structured and arranged for resonant coupling of energy into a recording medium.

17. The recording head of claim 16, wherein the tilted metallic pin is tilted at an angle θ from a plane normal to a surface of the recording medium wherein $21.8° \leq \theta \leq 70°$.

* * * * *